Aug. 5, 1941.　　　J. E. PADGETT　　　2,251,598
AUTOMATIC CLUTCH MECHANISM
Filed Aug. 16, 1933　　　4 Sheets-Sheet 1

Inventor
Joseph E. Padgett
Strauch & Hoffman
Attorneys

Aug. 5, 1941.    J. E. PADGETT    2,251,598
AUTOMATIC CLUTCH MECHANISM
Filed Aug. 16, 1933    4 Sheets-Sheet 4

Inventor
Joseph E. Padgett

By
Strauch & Hoffman
Attorneys

Patented Aug. 5, 1941

2,251,598

UNITED STATES PATENT OFFICE 2,251,598

AUTOMATIC CLUTCH MECHANISM

Joseph E. Padgett, Toledo, Ohio, assignor to Automatic Drive & Transmission Company, Gloucester City, N. J., a corporation of New Jersey Application August 16, 1933, Serial No. 685,442

19 Claims. (Cl. 192—105)

The present invention relates to automatic clutch mechanisms. More particularly, the present invention relates to automatic or self-operating clutches and is particularly concerned with mechanisms for controlling their operation.

In copending application Serial Number 677,152, filed June 22, 1933, in the name of Wade D. Morton and William E. Haupt, automatic clutches of the type wherein speed responsive mechanism is employed to engage and disengage the clutch, having throwout mechanism associated therewith which may be employed to engage or disengage the clutch, are disclosed as having power operated mechanism for moving the throwout mechanism toward disengaged position, and a latch mechanism for limiting movement of the throwout mechanism under the influence of the power operated mechanism. With the mechanisms just described, power operated mechanism may be utilized for declutching the automatic clutches and for automatically bringing the parts into automatic position when the prime mover associated therewith is started. The power operated mechanism of such clutches may also be employed for introducing power, or torque responsive phases into their operation. The present invention is concerned with generally refining the design of the mechanisms shown in the above-mentioned copending application, and to improving and modifying their operation in a manner that will appear hereinafter.

It is a primary object of the present invention to devise mechanisms for controlling both the engaging and disengaging movements of the throwout mechanisms of clutches of the type wherein speed responsive means is normally employed to produce clutch engagement.

It is another major object of my invention to devise for use in clutch mechanisms of the type wherein an axially movable clutch element is acted upon by resilient means, novel mechanisms for limiting the movement of the clutch element against the action of the resilient means.

Another important object of my invention is to devise, for use in clutch mechanisms of the type wherein an axially movable member is acted upon by resilient means, a novel mechanism controlled in accordance with movement of the member, for controlling its movement under the influence of the resilient means.

It is a further object of the present invention to provide drive mechanisms of the type wherein an automatic clutch, having a movable member which is acted upon by resilient means, is associated with a prime mover, wtih mechanism for controlling a portion of the movement of the member under the influence of the resilient means in accordance with attainment of certain conditions in the prime mover, and for automatically controlling another portion of movement of the member.

My invention further aims to provide automatic clutches of the type having a movable element which is acted upon by resilient means, and which has power operated mechanism associated therewith for opposing the action of the resilient means, with means for limiting movement of the element in one direction under the influence of the power operated means, and for controlling movement thereof in the opposite direction under the influence of the resilient means.

Another object of my invention resides in the provision of automatic clutches of the type wherein a movable element is acted upon by resilient means, with mechanism for automatically varying the rate of movement of the element as it moves into various positions under the influence of the resilient means.

It is a further object of the present invention to devise, for use in automatic clutches of the type having a throwout mechanism which is resiliently urged from a disengaging to an engaging position, means for causing the throwout mechanism to move comparatively rapidly from disengaging position to an intermediate position, and to move at a slower rate from intermediate position to engaging position.

Another object is to devise a novel latch mechanism for use in connection with the throwout mechanisms of friction clutches, which is simple and rugged in design and which will withstand heavy forces; and yet which may be readily unlatched, even when it is under substantial load.

It is a further object of the present invention to provide power-delivery mechanisms of the type wherein a prime mover is coupled to a speed-responsive clutch mechanism, with novel means for introducing a power responsive phase into operation, which is independent of the operation of the power-delivery-controlling mechanism of the prime mover.

It is another object of my invention to devise, for use in friction clutch mechanisms of the type wherein the throwout mechanism thereof is actuated by a device deriving fluid energy from a prime mover associated therewith, means for preventing fluctuations in the magnitude of the energy, supplied by the prime mover from introducing undesirable characteristics into the operation of the mechanisms.

My invention further aims to provide novel latch mechanisms for exerting movement-limiting forces to throwout mechanisms of friction clutches, which require forces of only nominal magnitude to be applied to them for unlatching purposes, even when they are under substantial load, and which, after the unlatching operation has been initiated, exert a self-energizing effect and complete their unlatching operation.

Another object of the present invention is to devise novel latch mechanisms for use in clutches which have parts pivotally connected to the respective members which they are adapted to latch, and to each other, whereby friction is avoided and they may accordingly be unlatched with a minimum of effort even when they are under substantial stress.

Further objects of my invention will become apparent as the detailed description thereof proceeds in connection with the annexed drawings, and from the appended claims.

With continued reference to the drawings, wherein like reference characters are employed to designate like parts throughout the several views thereof, I have illustrated the automatic clutch mechanism shown in my copending application Serial Number 676,567, filed June 19, 1933, now Patent No. 2,090,264, dated August 17, 1937, which may be referred to for a more detailed disclosure thereof.

Briefly, the automatic clutch is constructed and operates as follows: Driving and driven shafts 1 and 2 respectively are mounted for rotation in any suitable manner and the driving shaft carries a flywheel 3 which has a cover 4 secured thereto. A driven disc 5, having facings 6 secured thereto, is carried by a hub 7 splined to shaft 2 and cooperates with a face of flywheel 3 and with an automatic plate 8, which is mounted for synchronous rotation with the driving shaft 1 and flywheel 3 by means of driving lugs 9 which are secured to cover 4 and seat in recesses in the automatic plate. A reaction plate 11 is mounted for rotation with, and is urged toward the automatic plate by means of hold-back spring assemblies, (not shown) and the automatic and reaction plate assembly is urged toward the flywheel by means of compression springs 12 which are interposed between cover 4 and plate 11.

Figure 1:
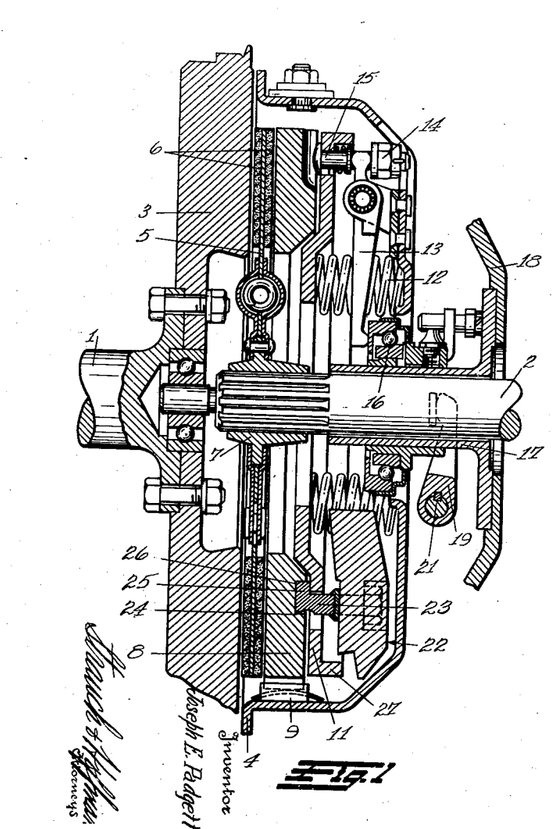
Figure 1 is a longitudinal sectional view of one form of automatic clutch to which my invention may be applied.

Movement of the automatic and reaction plate assembly under the influence of springs 12 is adapted to be controlled by means of levers 13 journalled on cover 4 and which act against nut and washer assemblies 14 carried by bolts 15 secured to plate 11. The inner ends of levers 13 cooperate with a throwout assembly 16 which is mounted for axial movement on a supporting sleeve 17 secured to a housing 18. Throwout assembly 16 is actuated by means of a throwout fork 19 secured to a throwout shaft 21. In Figure 1, the throwout assembly is disposed in automatic position, and it is maintained in this position against the action of springs 12, during certain phases of operation of the clutch by mechanism to be presently described.

Automatic plate 8 and reaction plate 11 are adapted to be forced away from each other in response to acceleration of the driving shaft, by means of a plurality of weights designated generally at 22. Weights 22 are carried by levers 23 which have laterally extending portions 24 disposed and clamped between plates 8 and 11 by means of the hold-back assemblies. Lever portions 24 are provided on their outer sides with knife edges 25 which are adapted to fulcrum in the outer corners of recesses 26 formed in the automatic plate when the levers swing outwardly in response to centrifugal force.

With driving shaft 1 operating at idling or disengaging speed, and with the throwout mechanism disposed in the position shown in Figure 1, the plates are disengaged and shafts 1 and 2 are accordingly uncoupled. As shaft 1 is accelerated above idling speed, weights 22 rock outwardly about edges 25 as axes and force plates 8 and 11 away from each other and cause pressure to be built up in springs 12 and between the plates. This action forces reaction plate 11 to the right and thereby relieves levers 13 of the stress of springs 12. Torque of gradually increasing magnitude is thereby automatically transmitted from shaft 1 to shaft 2, and when shaft 1 attains a predetermined speed the plates are brought into non-slipping engagement by the action of the weights, and at a speed slightly in excess of this speed the weights move out into engagement with a flange 27 provided on plate 11 and they are thereby prevented from moving further outwardly and building up further pressure between the plates in response to further acceleration of the driving shaft. When the driving shaft is decelerated to idling speed the automatic and reaction plates are brought towards each other by the hold-back assemblies and the clutch is thereby disengaged.

When the clutch is automatically engaged in the manner just described, the plates may be disengaged by moving the throw-out mechanism to the left, which, through levers 13 and bolts 15 moves reaction plate 11 and automatic plate 8 to the right, and thereby disengages the latter from the driven member.

When the parts are disposed in the positions shown in Figure 1, with the driving shaft operating at or below idling speed, the plates may be brought into driving engagement by allowing the throwout assembly to move to the right under the influence of springs 12. Movement of the throwout assembly to the right allows springs 12 to force plates 8 and 11 to the left and bring plate 8 into driving engagement with the driven member. Throwout shaft 21 extends outwardly of housing 18 and carries a clutch pedal 28 thereon, which is rigidly secured to shaft 21 by any suitable means such as a key 29 or the like. Pedal 28 is provided with a downwardly extending portion to which a tension spring 30 is secured. Spring 30 is anchored to any stationary suitable part of the mechanism and is adapted to return the pedal to retracted position.

Pedal 28 may be operated to rock shaft 21 and move the throwout assembly axially and thereby perform the various functions described in connection with the throwout assembly, but I preferably utilize an automatic mechanism for producing the operative movements of the throwout assembly. The mechanism about to be described may be operably connected to the throwout assembly in any desired manner, but I prefer to connect it to the throwout shaft. To this end a lever 31 is rigidly connected to shaft 21, and it is provided with bifurcations 32 which embrace shaft 21 and are gripped therearound by means of a cap screw 33. The upper end of lever 31 is pivoted to a clevis 34 by means of a pin 35. A link 36 is adjustably threaded into clevis 34 and into a sleeve member 37. Sleeve 37 constitutes a piston rod and clamped thereto by means of a cap screw 38, is a cushioning element 39; a washer 41; a pair of piston elements 42 having a sealing member 43 interposed therebetween; a piston sealing spring 44, a sealing spring retainer 45; and a second cushioning member 46. The piston assembly just described cooperates with a cylinder 47 having a head 48 and an open end which is closed by means of a cover 49 secured thereto. Cushioning element 39 cooperates with head 48 and cushioning element 46 cooperates with a sleeve-like guide 51 in which sleeve 37 is slidably supported.

A fitting 52 is connected to cylinder head 48 and is secured to a pipe 53. Pipe 53 is preferably tapped into the intake manifold 54, slightly above the throttle valve 55 of the internal combustion engine indicated at 56, and while this structure is satisfactory it is to be understood, that if desired, valve and control organizations of the type shown in my copending application Serial Number 669,766 filed May 6, 1933, now Patent No. 2,144,298, dated January 17, 1937, may be associated with pipe 53 for controlling the flow of fluid between the intake manifold and cylinder 47.

The piston and cylinder assembly just described may accordingly be employed to oscillate shaft 21 so as to move the throwout assembly from its right hand to its left hand position against the action of springs 12, and I preferably provide means for stopping the throwout assembly in an intermediate position to be presently described. Cover 49 is provided with a bleed hole 57, and sleeve 37 is provided with spaced apertures 58 and 59 for a purpose that will presently appear.

Figures 2, 3:
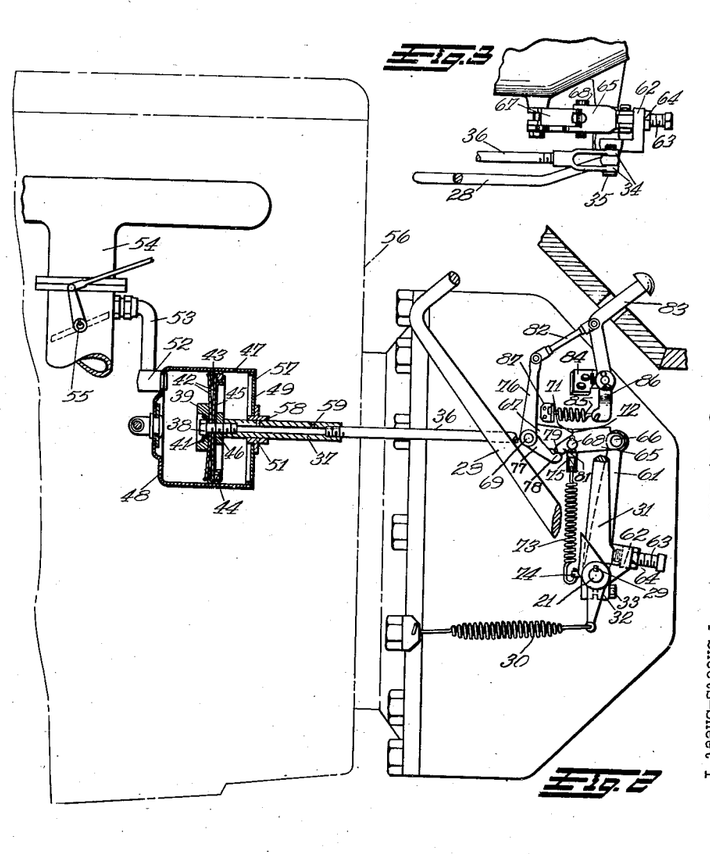
Figure 2 is a view in elevation of the clutch shown in Figure 1 and illustrates an internal combustion engine and one form of my controlling mechanism associated therewith.
Figure 3 is a plan view, with parts broken away and in section, of the control mechanism shown in Figure 2.

The mechanism employed to selectively arrest movement of the piston and throwout mechanism under the influence of the vacuum in the intake manifold comprises a lever 61 which is preferably journalled on shaft 21, although it may if desired be pivotally supported in any other suitable manner. An offset arm 62, preferably integrally formed with lever 31, threadedly receives a screw 63, which is adapted to be adjustably held in position therein by means of a locknut 64. The upper end of lever 61 is pivoted to a link 65 by means of a pin 66. Link 65 is U-shaped in cross-section and is pivotally connected to a similar link 67 by means of a pin 68 passing through the legs of the links. Link 67 is pivotally supported on a cap screw 69, which is threaded into any suitable support, such as the clutch housing or the engine block, and which is shouldered so that it may be turned home without exerting frictional forces upon the link. The adjacent edges 71 and 72 of links 65 and 67 abut, as seen in Figures 2 and 3, when the parts are in latching or locking position. Links 65 and 67 form, in effect, a toggle joint, and they are urged into the position shown in Figure 2, with pin 68 disposed slightly below "dead center," or a line between cap screw 69 and pin 66, by means of a tension spring 73 whose lower end is anchored to a projection 74 formed on lever 61. The upper end of spring 73 is connected to an apertured member 75, which is journalled on pin 68. When links 65 and 67 are held in the positions shown in Figures 2 and 3, the throwout assembly is disposed in the position shown in Figure 1, and the cylinder and piston assembly is accordingly incapable of moving the throwout assembly further to the left. This position will be hereinafter termed the automatic position, for the reason that the parts are preferably so disposed when the device is operating or being utilized as an automatic clutch.

The parts are adapted to be unlatched by means of a lever 76 which is journalled on cap screw 69 and is provided with an arm 77 having a curved face 78. Face 78 is adapted to cooperate with the face 79 of a lug 81 preferably formed on link 65. Pivotally connected to the upper end of lever 76 is a link 82, which is connected to a pedal 83. Pedal 83 is journalled on the device in any suitable manner, for instance by means of a bracket 84 or the like and is normally urged into retracted position by means of a tension spring 85 which is secured to a downwardly extending arm 86 thereof, and to a bracket 87 or the like.

Figures 4, 5, 7:
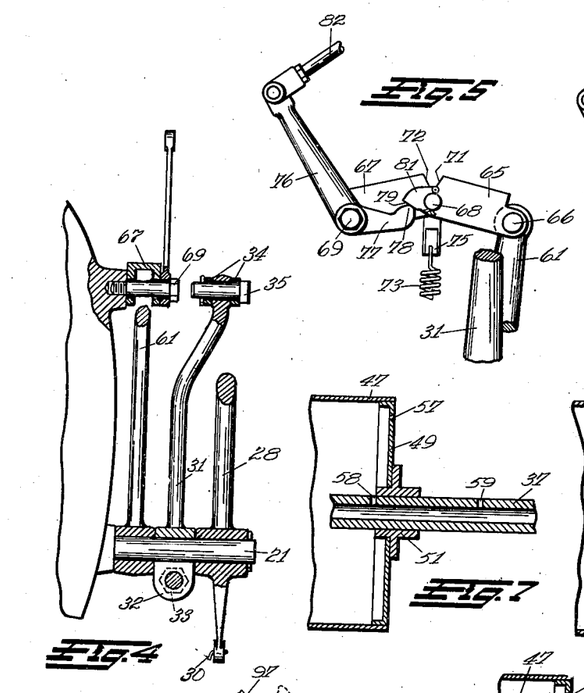
Figure 4 is a fragmental view taken partly in section from the left hand side of Figure 2.
Figure 5 is a fragmental view of the novel latch mechanism employed in the mechanism shown in Figure 2 and illustrates the parts in the position they assume at the instant that the latch operating control has been fully actuated.
Figure 7 is a fragmental sectional view of the cylinder assembly shown in Figure 2 and illustrates the parts in the positions they assume when they are approaching automatic position under the influence of the clutch springs.
Figure 6:
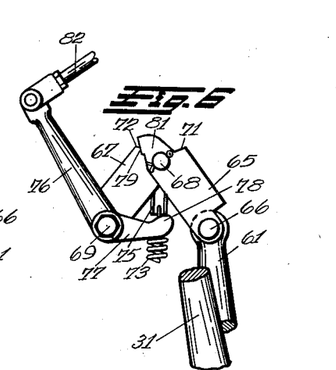
Figure 6 is a view similar to Figure 5, but illustrates the parts disposed in the positions they assume when the throwout mechanism is held in fully declutched position.
Figure 8:
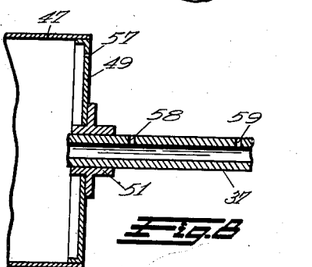
Figure 8 is a view similar to Figure 7, but illustrates the parts in the positions they assume when they have been brought to the right of automatic position under the influence of the clutch springs.

When pedal 83 is fully depressed, curved face 78 of arm 77 cooperates with face 79 of lug 81 and swings the latter upwardly, bringing pin 68 above dead center as seen in Figure 5. When the parts attain this position, and the vacuum in the intake manifold is sufficiently high, the piston and cylinder assembly, acting through link 36, lever 31, screw 63, and lever 61, swings links 65 and 67 into the position shown in Figure 6 against the action of spring 73.

Assuming that the present mechanism is installed in a motor vehicle having a conventional transmission, and the clutch has been fully disengaged in the manner just described, through actuation of pedal 83, for the purpose of shifting the transmission into another gear, and it is desired to re-engage the clutch, pedal 83 is released and the accelerator is depressed.

Depression of the accelerator causes the engine to accelerate, and the pressure in the intake manifold rises. When the pressure has risen to a predetermined value, the piston assembly is allowed to move to the right, under the influence of springs 12 acting through levers 13, and the throwout assembly. When this operation is taking place, fluid (gasoline air-vapor) bleeds out of intake manifold 54, through pipe 53 and into the left hand side of the cylinder. Air also bleeds out of the right hand side of the cylinder through port 58, sleeve 37 and port 59. Some air is also bled to the atmosphere through bleeder aperture 57. In view of the fact that the exhaust of air from the right hand end of the cylinder under these conditions is substantially unrestricted, movement of the parts toward automatic position is comparatively rapid if the intake manifold pressure rises at a comparatively rapid rate.

When the piston has moved preferably to within three-eights of an inch of automatic position during the operation just described, sleeve 37 is brought with its port 58 adjacent member 51, as seen in Figure 7, with the result that further movement of sleeve 37 cuts off port 58, and causes air to be compressed in the right hand end of the cylinder, as air can now only escape therefrom through the relatively small aperture 57. The parts are preferably so designed that port 58 is cut off and stable air pressure conditions are attained in the right hand end of the cylinder just prior to the time that the piston assembly, which is now undergoing relatively slow movement under the retarding action manifested by the action of air escaping from orifice 57, attains automatic position.

The parts are preferably so designed that when the piston and throwout assembly have attained automatic position, or shortly thereafter, weights 22 rock outwardly in the manner previously described and bring the plates into frictional engagement with the result that the vehicle is smoothly picked up in the selected gear. As the engine is further accelerated, weights 22 swing further outwardly and produce a further pressure build-up between the plates, and the piston continues to move slowly to the right, now under the influence of spring 30, as operation of the weights has caused reaction plate 11 to move to the right and thereby relieved levers 13 of the pressure of springs 12.

When the piston assembly attains automatic position under the influence of the bleeding operation just described, lever 61 is restored to the position shown in Figures 2 and 3 under the influence of spring 73 acting upon links 65 and 67, and the latter are restored to the positions in which they are shown in Figures 2 and 3, as lever 76 has been restored to normal position by spring 85, acting through arm 86 and link 82. The parts are accordingly locked, and should the accelerator be released when the clutch has been fully engaged in the manner just described, the resulting high vacuum produced in the intake manifold does not produce clutch disengagement, by reason of the fact that lever 61 and its associated latch prevents lever 31 and the throwout assembly from being moved past automatic position under the pull of the piston assembly.

If it is desired to shift from the selected gear into a higher or lower gear, pedal 83 is again depressed and released and the accelerator operated to produce clutch engagement in the manner previously described. If desired, however, pedal 83 may be maintained in depressed position throughout the shifting operation as return movement of lever 31 from fully engaged position to automatic position will engage bolt 63 thereof with lever 61 and cause the latter to be carried with lever 31 into disengaged position under the pull of the piston.

When the vehicle is proceeding in gear with the clutch fully engaged and pedal 83 released, and it is desired to decelerate the vehicle, the accelerator is released, which causes the parts to be brought into automatic position in the manner previously described. The clutch remains engaged under the influence of weights 22 so long as the driving shaft is maintained above their engaging speed, and the vehicle is accordingly decelerated under the braking effect of the engine. In the event that while proceeding in this manner it is desired to bring the vehicle to a stop, the vehicle brake mechanism may be operated to augment the braking effect of the engine. When the vehicle is brought down to a speed corresponding substantially to the disengaging speed of weights 22 under the combined braking effect of the engine and the brake mechanism, the hold-back assemblies disengage the clutch and the vehicle may be brought to a complete stop by continued application of the brakes, or if desired, the accelerator may be depressed to cause the clutch to automatically re-engage in the manner previously described, and pick up the vehicle in the particular gear involved.

Should the engine stall at any time, from lack of fuel or any other cause, the piston and throwout mechanism are automatically bled back into fully engaged position under the influence of springs 12, and the clutch is thereby automatically engaged, and if the transmission is in gear, a drive between the vehicle wheels and the engine is automatically established and in the event that the vehicle is in motion, the momentum of the vehicle may be accordingly utilized to turn the engine over. The vehicle may also be towed or coasted with the transmission in gear and the clutch automatically engaged in this manner for the purpose of turning the engine over for cranking purposes in winter when the battery is too weak to turn the engine over. The transmission may also be placed in low or reverse gear and the vehicle propelled away from a dangerous location by means of the starting motor should the engine stall under such circumstances.

When the engine is started, a vacuum is immediately established in the intake manifold, and with pedal 83 released, the piston assembly pulls the throwout mechanism into automatic position, and during this operation air bleeds through aperture 57 into the right hand end of cylinder 47. If the retarding action of the aperture is undesirable in the particular installation involved, a check valve (Figure 10) of any suitable form may be associated with cover 49 for permitting air to bleed rapidly into the right hand side of the cylinder for accelerating movement of the parts from engaged to automatic position in the manner just described. With the engine operating at idling speed, the parts are held in automatic position by the intake manifold vacuum and the clutch is disengaged. The transmission may accordingly be shifted into any desired gear without operating pedal 83 or the clutch pedal, and the engine accelerated to produce clutch engagement under the influence of weights 22 in the manner previously described. During this operation the piston assembly is bled back into engaged position through the action of air bleeding out of cylinder 47 through aperture 57 as previously explained. Pedal 83, or the clutch pedal need only be employed when it is desired to shift from one gear into another with the vehicle in motion.

With the novel form of clutch mechanism illustrated, it is contemplated that the vehicle be started and operated solely in high gear under normal driving operations, but if it is desired to get the vehicle away quickly in traffic or when on a hard pull, the clutch may be disengaged in the manner previously described.

When facings 6 undergo sufficient dimensional changes, as the result of particles thereof wearing away during operation, to establish too great a clearance between the plates when the latter are disposed in automatic idling position, which has the effect of delaying clutch engagement in response to acceleration of the driving shaft, locknut 64 may be loosened and bolt 63 unscrewed sufficiently to re-establish proper idle release clearance, and nut 64 tightened to lock the parts in adjusted position.

The engaging operation of the mechanism just described is fully speed-responsive, i. e., the bleeding action of the piston lags behind the action of the automatic weights and therefore does not influence the clutch engaging operation, whether the parts are bled to fully engaged position from disengaged or automatic position. In another embodiment of my invention, which I intend to be embraced by the present application, aperture 57 is of a slightly larger dimension, so that the engaging operation takes place in the following manner.

With the parts held in automatic position, either by the latch mechanism or by the momentary checking influence that aperture 57 exerts upon the piston, springs 12 are placed under compression or are pre-loaded, and acceleration of the driving shaft causes weights 22 to bring the plates into engagement in the manner previously described. When weights 22 have built up a predetermined pressure between the plates, which is of smaller magnitude than the preloading of springs 12, the vacuum in the intake manifold falls sufficiently to allow the piston and throwout mechanism to relieve levers 13 of substantial pressure and thereby impose the full pressure of springs 12 upon the plates. With this form of the invention, clutch engagement accordingly occurs in two stages, first, a speed responsive stage, wherein the plate pressure is built up comparatively slowly and the load accordingly picked up smoothly, and secondly, a power or torque responsive stage wherein the full driving pressure of the clutch springs is applied to the plates in response to attainment of certain conditions in the prime mover.

In connection with this form of the invention, it is to be understood that any suitable automatic or accelerator pedal operated valve mechanism may be associated with the vacuum line 53 for effecting or assisting the above described pressure staging operation, if desired, without departing from the spirit of my invention.

Figure 9:
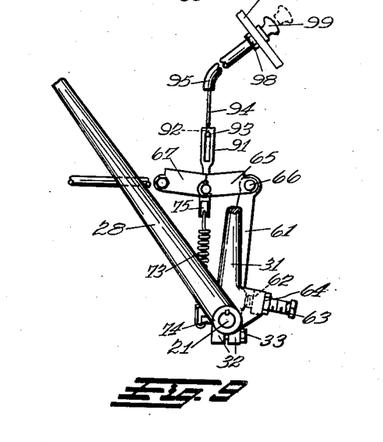
Figure 9 is a fragmental view illustrating a modified form of mechanism for actuating the latch mechanism shown in Figure 2.

With reference now to Figure 9 of the drawings, I have illustrated a modified form of mechanism for actuating the latch mechanism shown in Figure 4. In this form of the invention, a yoke member 91 is journalled on pin 68 and is provided with an aperture 92 at its upper end. Extending through aperture 92, and having an enlarged portion 93 at its lower end, is an actuating wire 94, which extends upwardly within a flexible housing 95. The lower end of housing 95 is supported in any suitable manner, as for instance by means of a bracket (not shown) or the like, and although wire 94 may be foot pedal actuated if desired, the upper end of housing 95 is preferably connected to the vehicle dash 97, or any other conveniently located support, by means of a nut 98. A control knob 99 is connected to wire 94, and is adapted to be grasped and pulled into the dotted line position shown.

The lower end of yoke member 91 is connected to spring 73, which, in addition to its previously described functions, tends to maintain yoke 91 in a vertical position at all times.

The operation of this form of latch actuating mechanism is similar to that described in connection with that form shown in Figure 2. When knob 99 is pulled out into its dotted line position, the center of the toggle formed by links 65 and 67 is pulled upwardly past dead center against the action of spring 73, and if the piston and cylinder assembly is energized at the time, the latter pulls the parts into disengaged position. When the latter operation takes place, yoke 91 moves into its uppermost position and slides up on wire 94. The slot in yoke 91 provides sufficient lost motion to allow the yoke to move into its upper position without tending to kink the wire.

Figure 10:
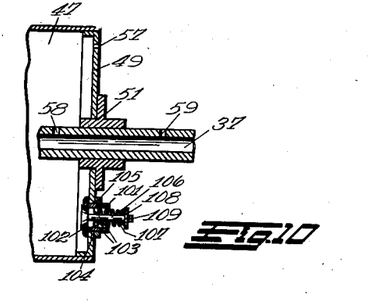
Figure 10 is a fragmental sectional view of a modified control cylinder assembly which may be used in the device shown in Figure 2.

In Figure 10, I have shown the cylinder shown in Figure 2 provided with a check valve for permitting the parts to be comparatively rapidly pulled from engaged to automatic position. A valve body 101 having a valve seat 102, and valve guiding and spring retaining fingers 103, seats in an aperture 104 formed in cover 49, and is secured thereto by means of a nut 105. Guided in members 103 and adapted to cooperate with seat 102, is a valve 106 which is urged toward its seat by means of a spring 107. Spring 107 seats on members 103 and reacts against a washer 108 secured against endwise displacement on valve 106 by means of a pin 109.

When the piston is moved to the left (Figure 2) in response to the creation of a vacuum in the intake manifold of the engine, a partial vacuum is created in the right hand end of the cylinder in view of the restricting influence of aperture 57 to the flow of air into the cylinder. The pressure difference thus created lifts valve 106 off of its seat against the action of spring 107, and admits air into the right hand end of the cylinder, with the result that the vacuum is broken therein and movement of the parts from engaged to automatic position may take place fairly rapidly. Valve 106 may open when the parts are moving from automatic to disengaged position, but the relatively large bleed provided by ports 58 and 59 in sleeve 37 is usually sufficient to handle the flow of air into the cylinder, and prevent the formation of a partial vacuum therein. When the piston and its associated parts moves in the opposite direction, and tend to compress the air in the right hand end of the cylinder, valve 106 remains seated and air is accordingly compelled to bleed out of the cylinder through aperture 57 and ports 58 and 59 in the manner previously described.

Figures 11, 12, 13, 14:
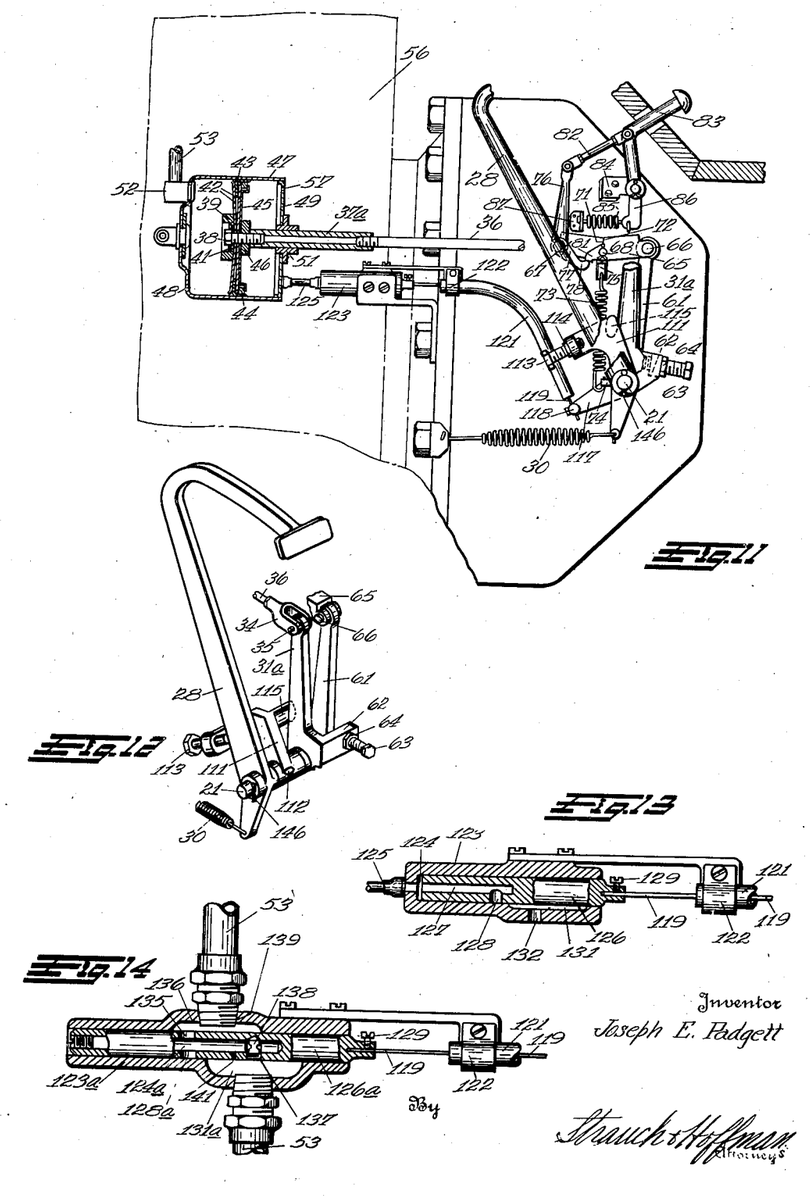
Figure 11 is a longitudinal view, with parts in section, of a modified form of automatic clutch controlling mechanism forming part of my invention.
Figure 12 is an isometric view of the throwout shaft assembly shown in Figure 11.
Figure 13 is a detailed sectional view of the valve employed in the device shown in Figure 11.
Figure 14 is a detailed sectional view of a further modified form of valve which may be employed in connection with my novel mechanisms.

With reference to Figures 11, 12 and 13, I have illustrated a further modification of my invention and as many of the parts are identical in structure and function with those shown in Figure 2 of the drawings, they will be designated by like reference characters and their description will be omitted for sake of brevity.

Referring more particularly to Figure 12, clutch pedal 28 is mounted freely on shaft 21 and in this form of the invention levers 31a and 61 are freely journalled on shaft 21. Mounted on and secured to shaft 21, intermediate lever 31a and pedal 28 is a lever 111, to which is secured shaft 21 by means of a pin 112 or the like. Lever 111 is offset to underlie pedal 28 and has a screw 113 threaded therein which is adapted to be locked in place by means of a locknut 114. Screw 113 is adapted to be contacted by pedal 28, and in the position shown in Figures 11 and 12, it is spaced therefrom because pedal 28 is held in fully retracted position by spring 30, and the other parts are held in automatic position by means of the vacuum operated mechanism.

Lever 111 is also provided with a laterally extending finger 115, which is adapted to engage the underside of lever 31a, and arm 62 of lever 31a cooperates with lever 61 in a manner similar to that described in connection with Figure 2. The lever assembly is restrained against endwise displacement on shaft 21 by means of a cotter pin 146.

In this form of the invention, lever 61 carries a downwardly extending arm 117 which supports a swivelled Bowden wire fitting 118, which is connected to a Bowden wire 119. A flexible housing 121, which encloses wire 119 and is supported by a bracket 122 or the like, is led to a valve mechanism for controlling the flow of air from cylinder 47.

With particular reference to Figure 13, a valve casing 123, having a cylindrical bore 124 is supported in any suitable manner and is connected to head 49 of cylinder 47, by means of a pipe 125. Sleeve 37a is not provided with ports, and therefore all of the air exhausted from cylinder 47 in this form of the invention must be handled by bleeding aperture 57 and pipe 125. A cylindrical valve 126, having a longitudinal passage 127, and a transverse passage 128, is slidably mounted in passage 124 and is connected to Bowden control wire 119 by means of a set screw 129, threaded into the end thereof. Valve casing 123 is provided with a longitudinal groove 131 and an exhaust port 132 communicating therewith, which are adapted to cooperate with the transverse passage formed in valve 126.

With the engine operating substantially at idling speed, and with the latch mechanism locked, the parts appear as they are seen in Figures 11, 12 and 13, in automatic position, with the plates disengaged and with transverse passage 128 disposed out of registry with groove 131. If under these conditions the transmission is placed in gear and the engine accelerated, the weights 22 rock outwardly and bring the plates into engagement in the manner previously described and smoothly pick the vehicle up in the gear involved. While this engaging operation is taking place, the piston assembly moves to the right, and if desired port 57 may be designed to cause the clutch to have a power responsive stage as previously explained. While this bleeding operation is taking place, valve 126 remains in the position shown in Figure 13 because arm 62 carried by lever 31a, merely moves away from lever 61 under this condition, and in fact levers 31a and 111 are the only members associated with shaft 21 that undergo movement while the latter is moving from automatic to engaged position. When the bleeding action is complete, screw 63, carried by arm 62, is spaced from lever 61, and screw 113, carried by lever 111 is disposed in close proximity to clutch pedal 28.

If it is desired to declutch the mechanism pedal 28 may be depressed or pedal 83 may be actuated to cause shaft 21 to be moved into disengaging position. Taking the operation attending depression of pedal 28, downward movement thereof causes the latter to engage screw 113, thus producing similar movement of lever 111 and shaft 21 and disengaging movement of the throwout mechanism is thereby effected. During this operation levers 31a and 61 remain motionless in view of the one-way connection existing between them and lever 111, and it is accordingly unnecessary to unlock the latch mechanism for this declutching operation. As this operation is entirely independent of the piston and cylinder assembly, the latter does not set up any retarding influences on the parts when they are being returned to engaged position until automatic position is reached, and the operation is accordingly wholly under the control of the operator.

The disengaging operation, as effected by operating pedal 83, is as follows. Depression of pedal 83 (or actuation of knob 99) unlocks the latch mechanism as previously explained, and if the vacuum in the intake manifold is sufficiently high, the piston assembly pulls levers 31a, 61, and 111, and shaft 21 into disengaging position. Initial movement of the parts toward disengaged position tends to produce a partial vacuum in the right-hand end of cylinder 47, but in view of the fact that this movement, through arm 117 and wire 119, moves valve 126 with its passage 128 into registry with groove 131, thereby allowing air to bleed through port 132, groove 131, passages 128 and 127, and pipe 125 into cylinder 47 shortly after initiation thereof, disengaging movement of the parts is substantially unretarded. Similarly, when the vacuum in the intake manifold falls, as the result of opening the engine throttle, the parts move comparatively rapidly toward automatic position, and when they reach a predetermined position valve 126 cuts off atmosphere communication, and their motion into engaged position is retarded at a rate controlled by the exhaust of air through port 57.

The other functions of this form of my invention are identical to those described in connection with the form shown in Figure 2. It is to be understood that the valves shown are only illustrative of one concrete example of the present invention and that any other suitably designed valve may be successfully utilized in connection therewith.

In Figure 14 I have illustrated a valve somewhat similar to that shown in Figure 13, but in this instance it is interposed in the line interconnecting the intake manifold and the cylinder.

With continued reference to this figure, valve 126a is actuated by lever 61 through the Bowden wire assembly, and is provided with a relatively large aperture 135, which communicates with passage 124a and with a longitudinal groove 136, formed in casing 123a. Located in a bore 137 in valve 126a, and communicating with passage 124a and a groove 131a is a check valve 138, which may take any desired form, and which is therefore only shown diagrammatically. Valve 138 is designed to positively check flow of air from passage 124a to groove 131a, and when it lifts, in response to a predetermined preponderance of pressure in groove 131a to that existing in passage 124a, and allow air to flow from the left-hand end of the cylinder to the intake manifold by way of pipe 53, groove 131a, valve 138, passage 124a, aperture 135, groove 136 and an aperture 139 formed in casing 123a. Valve 126a is also provided with an orifice 141, which places passage 124a and groove 131a in fluid communication at all times.

In this form of the invention, cylinder head 49 is provided with a relatively large aperture (not shown) so that air may readily pass into and out of the right-hand end of cylinder 47 without restriction, and no valve parts are utilized in sleeve 37a.

The operation of this device is somewhat similar to that of the previously described forms of my invention, with the exception that the rates of movement of the parts are controlled by controlling the fluid supplied to the cylinder. With the engine stopped the parts are disposed in engaged position under the influence of springs 12, and shafts 1 and 2 are coupled together. When the engine is started with the latch locked, holding valve 126a in the position shown in Figure 14, the resulting intake manifold vacuum lifts valve 138 off of its seat and air is rapidly withdrawn from cylinder 47, which causes the piston assembly to move the parts into automatic position. During this operation air flows through pipe 53, groove 131a, valve 138, passage 124a, aperture 135, groove 136, aperture 139 and the upper section of pipe 53 into the intake manifold; a small quantity of air also passes from groove 131a to passage 124a by way of orifice 141.

With the parts disposed in the position above described, and with the engine operating at idling speed, the transmission may be placed in gear and the engine accelerated to automatically start the vehicle. Initial acceleration of the engine causes weights 22 to bring the plates into engagement in the manner previously described, and when the pressure in the intake manifold rises to a predetermined value as the result of accelerating the engine, the parts start to slowly move toward engaged position. As valve 138 is closed, and port 128a is out of registry with groove 131a under these conditions, air must bleed into cylinder 47 by way of pipe 53, passage 124a, orifice 141, and groove 131a, during the power responsive phase of the clutch engagement operation, and orifice 141 is so designed that the preloaded pressure of springs 12 is applied to the plates at the proper time for initiation of the second stage of clutch engagement as previously described. After the clutch has been fully engaged, in the manner just described, and the accelerator is released, the vacuum pulls the parts into automatic position, and after the engine has been decelerated to a predetermined speed, weights 22 release the clutch, as previously explained.

If it is desired to declutch the mechanism, pedal 83 is depressed (or knob 99 is pulled out), which unlocks the latch, and, if the vacuum in the intake manifold is sufficiently high, the piston assembly acting through rod 36, lever 31a, and 111, pulls the throwout mechanism into disengaging position. During this operation valve 126a through the intermediary of lever 117 and Bowden wire 119, is shifted to bring its port 128a into registry with groove 131a thus allowing air to be comparatively rapidly drawn out of and admitted to cylinder 47 when the parts are moved from automatic to disengaged position and restored thereto respectively. When the parts substantially attain automatic position, port 128a is brought out of registry with groove 131a, and thereafter bleed of air into the cylinder is solely through orifice 141, and movement of the parts is accordingly retarded throughout their travel from automatic to engaged position.

The exact point in the travel of the parts at which it is desired to cut off communication of port 128a and groove 131a may be readily established by loosening screw 129 and adjusting valve 126a with respect to wire 119.

Figures 15, 16, 17, 18, 19:
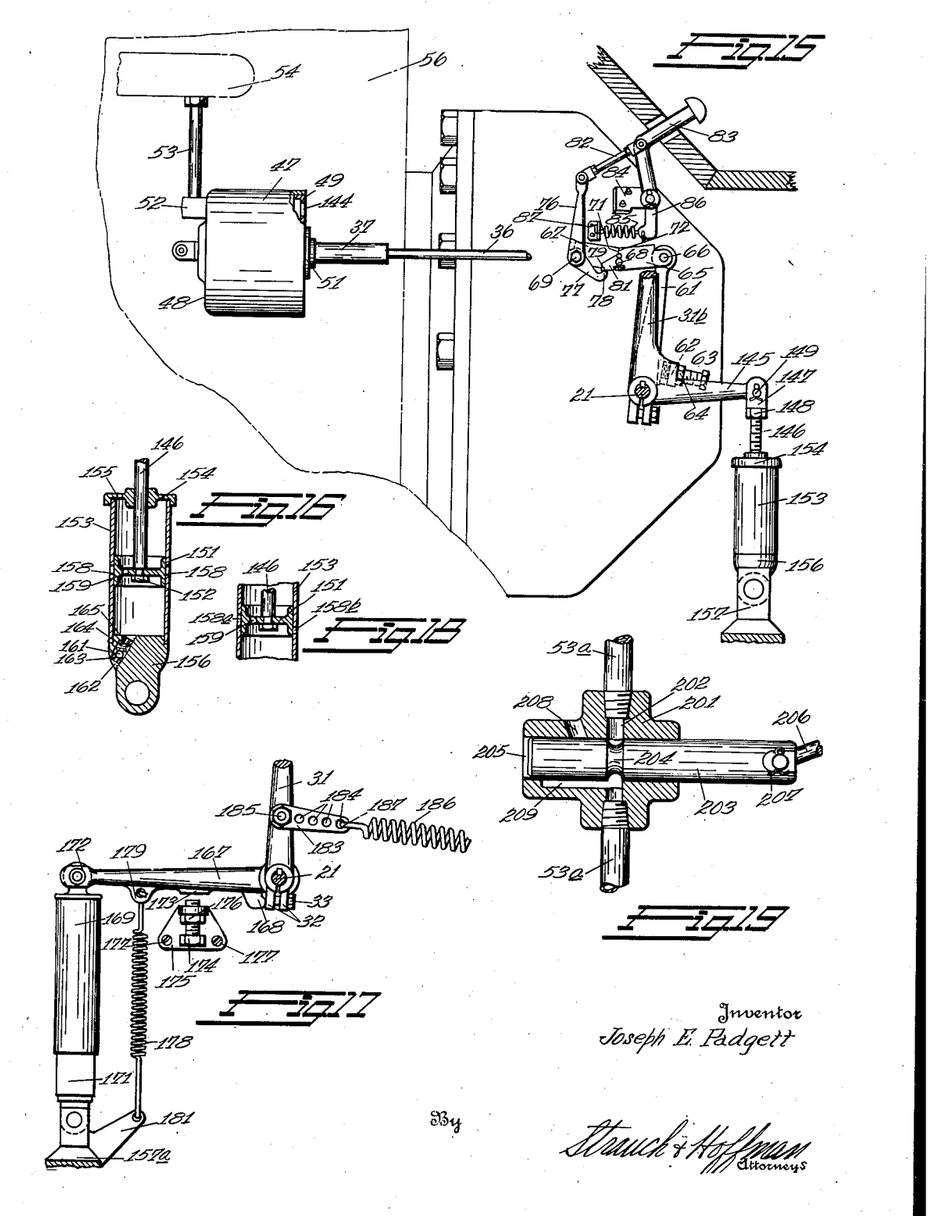
Figure 15 is an elevation view with parts in section of a modified controlling mechanism forming part of my invention.
Figure 16 is an enlarged sectional view of the retarding piston and cylinder assembly shown in Figure 15.
Figure 17 is a view illustrating the throwout assembly provided with a modified form of controlling organization also forming part of the present invention.
Figure 18 is a fragmental sectional view of the cylinder shown in Figures 15 and 16, as it appears when provided with a modified form of port arrangement.
Figure 19 is a sectional view of a valve mechanism forming part of my invention.

With reference now to Figures 15 and 16, I have illustrated a further modified form of controlling device which may be employed to control the throwout assemblies illustrated in Figures 2, 11 and 12.

In this form of the invention, cylinder head 49 is provided with a relatively large aperture 144 so that air may readily pass into and out of the right-hand end of cylinder 47. Lever 31b is provided with an arm 145 which is preferably integrally formed thereon and is adapted to control movements of the throwout shaft.

A piston rod 146, having a clevis 147 adjustably secured to its upper end, by means of a nut 148, and which is connected to arm 145 by means of a pin 149, has a piston 151 secured to its lower end by means of a nut 152. Piston 151 cooperates with a cylinder 153 which is provided with a head 154 having apertures 155 provided therein. Cylinder 153 is provided with a base portion 156 which is pivoted for slight rocking movement preferably in rubber bushings (not shown), upon a bracket 157. Bracket 157 may be secured to the clutch housing or transmission casing or any other suitable support in any desired manner.

Cylinder 153 is preferably provided with a plurality of radial ports 158 which are adapted to allow air to pass comparatively rapidly into and out of the lower end of cylinder 153 when they are uncovered by piston 151. Cylinder base 156 is preferably provided with a check valve for allowing air to rapidly enter the lower end of the cylinder when the piston is ascending and for compelling air to be forced through a bleed orifice 159 located in the piston when the piston is descending in its range of movement below ports 158, but it is to be understood that if it is desired, the check valve may be omitted and the air compelled to bleed into and out of the lower end of the cylinder through orifice 159.

The check valve may take any desired form and may be located in the piston if desired, but in the present instance it takes the form of a ball 161, which is located in a bore 162 in the cylinder base and is adapted to be urged toward a seat 163 formed in the base by means of a spring 164 or the like. Spring 164 is preferably relatively light so that it will allow ball 161 to be quickly unseated when the pressure in the lower end of the cylinder falls slightly below atmospheric pressure, and is held in place by means of an apertured plug 165 which is threaded into bore 162.

The parts are shown in Figure 15 in the position they assume when the engine is operating substantially at idling speed and the latch mechanism is in locked condition. If it is desired to automatically engage the clutch the engine is accelerated and weights 22 bring the plates into engagement in the manner previously explained. When the pressure in the intake manifold rises to a predetermined value, springs 12, acting through levers 13 and the throwout assembly, cause lever 31b and arm 145 to rock clockwise (Figure 15), and as the cylinder check valve is closed, and piston 151 covers ports 158, the air trapped in the lower end of the cylinder is caused to bleed slowly through orifice 159, with the result that movement of the parts is retarded. The retarding influence exerted upon the parts is determined by the size of orifice 159, and the latter may be designed to impart solely speed responsive characteristics to the mechanism, or, if desired, the orifice may be made of suitable size so as to introduce a power responsive phase into the operation of the mechanism in the manner described in connection with the previously described modifications of my invention.

In the event that the engine stops when the parts are disposed in the positions shown in Figure 15, springs 12 bring the plates into engagement against the retarding action of the piston and cylinder assembly in the manner just described. When the engine is re-started however the parts move into automatic position comparatively rapidly because valve 161 lifts off its seat and allows air to rapidly bleed into the lower end of cylinder 153 under the influence of the partial vacuum created therein by upward movement of piston 151.

When it is desired to declutch the mechanism, pedal 83 or knob 99 is actuated to bring the latch parts out of locked condition. The power cylinder then comparatively rapidly moves the parts into disengaged condition because check valve 161 lifts and breaks any vacuum that may be produced in the lower end of cylinder 153 as the result of upward movement of piston 151 therein, and when piston 151 has moved upwardly sufficiently to uncover ports 158, additional air may enter the cylinder through them. When the gear shifting or other operation has been completed, and the accelerator pedal has been depressed to accelerate the engine, the pressure in the intake manifold rises and allows the clutch springs to bring the parts into automatic position comparatively rapidly, for the reason that as piston 151 moves downwardly in cylinder 153, air is permitted to pass freely out of the cylinder through ports 158. Shortly before the parts reach automatic position under the influence of the clutch springs, piston 151 moves over ports 158 and thereby cuts off communication between cylinder 153 and the atmosphere. The air remaining in the lower end of the cylinder, after ports 158 have been cut off, acts as a cushion and substantially retards further movement of the parts toward engaged position, and the air is bled through orifice 159 throughout the remainder of the cushioning or retarding operation in the manner previously described.

Although I have illustrated the retarding piston and cylinder assembly as utilizing air as the operating medium it is to be understood that any other suitable fluid, such as oil or glycerine, may be used if desired without departing from the spirit of the present invention.

In the event that after screw 63 has been adjusted to re-establish proper idle release clearance between the clutch plates, the retarding assembly does not exert the proper retarding action upon the parts, clevis 147 may be adjusted upwardly or downwardly on rod 146 to re-establish proper operating conditions.

Although I have illustrated my invention as applied to the device illustrated in Figure 2 it is to be understood that it may be employed in the device shown in Figures 11 and 12, and in this instance, arm 145 may be integrally formed with lever 31a or member 111.

In Figure 17 I have illustrated a further modified form of retarding mechanism that may be utilized with the same power cylinder and throwout shaft assembly employed with the retarding mechanism just described.

In this form of the invention lever 31 is coupled to the retarding mechanism through a one way connection. Mounted for oscillation on shaft 21 is a lever 167 having an offset lug or finger 168 which is adapted to engage one of the bifurcations 32 of lever 31. When lever 167 is installed in the various modifications of the invention it is preferably located between levers 31 and 61 on shaft 21 and when it is so located in the device shown in Figures 11 and 12, the clutch pedal may be employed to rock shaft 21 entirely free from the influence of the retarding mechanism.

The retarding mechanism utilized in this form of my invention preferably takes the form of a fluid type automotive shock absorber or rebound check, and it consists of an upper section 169 which carries the piston (not shown) and a lower section 171 which carries the cylinder. Section 169 is connected to a clevis portion 172 of lever 167 by means of a rubber bushing assembly not shown, and lower section 171 is connected to bracket 157a by means of a similar assembly. The shock absorber contains a suitable fluid and a valve mechanism which is so designed that the fluid offers negligable resistance to movement of the piston when section 169 is moving downwardly or toward section 171, and exerts a predetermined retarding influence against upward movement of section 169. As the specific form of shock absorber employed is not essential to satisfactory operation of the device, and as it is disclosed in detail in my co-pending application Serial No. 673,587, filed May 31, 1933, it will not be further described.

Cooperating with a boss portion 173, formed on lever 167, is a screw 174, which is adjustably threaded into a bracket 175 and is adapted to be locked in position by means of a lock nut 176. Bracket 175 may be supported in any suitable manner on the transmission or clutch housing by means of screws 177 or the like. A tension spring 178, secured to an ear 179 formed on lever 167, is adapted to normally urge lever 167 toward stop-screw 174 for a purpose that will presently appear, and is anchored to an ear 181 formed on bracket 157a.

The parts are shown in automatic position in

Figure 17, with lever 167 engaged with portion 32 of lever 31, and spaced from stop screw 174. When the accelerator is depressed with the parts in this position, clutch springs 12, acting through shaft 21, rock lever 31 clockwise and through engagement thereof with lug 168, lever 167 is also rocked in a similar manner. Lever 167 is accordingly "picked up," and moves away from its stop screw 174 against the action of spring 178 and the retarding influence of the shock absorber. The parts accordingly move toward engaged position against the retarding action of sections 169 and 171, and it is to be understood that the valve mechanism may be designed to produce either a purely speed responsive clutch action, or a combined speed and power responsive action in the manner outlined in connection with the previously described forms of my invention.

When the engine stops, the parts move toward engaged position under the influence of the retarding mechanism in the manner just described, and when the engine is restarted, the power cylinder may pull the parts into automatic position comparatively rapidly for the reason that should the action of the retarding mechanism lag behind movement of lever 31, it does not exert retarding influences upon the parts because such lagging action merely results in portion 32 of lever 31 moving away from lug 168. In the event that such lagging action does occur, lever 167 may "follow up" comparatively rapidly under the influence of spring 178 because the shock absorber valve mechanism is preferably designed so as to allow sections 169 and 171 to move toward each other without substantial retardation.

In view of the fact that the lost motion connection which is utilized in this device in combination with the spring and lever assembly, renders it entirely feasible to employ a retarding mechanism that exerts a retarding effect when operated in either direction, and therefore a piston and cylinder having only a fixed orifice in the piston may be used with this organization with satisfaction, and it is to be understood that mechanisms of this character are intended to be embraced by the appended claims.

When the latch associated with lever 61 is unlocked, and the vacuum is sufficiently high, lever 31 is rocked counterclockwise, and as this action moves portion 32 of lever 31 away from lug 168, lever 167 moves into contact with screw 174 and remains in contact therewith during the disengaging operation, and movement of lever 31 and the throwout assembly into disengaged position is therefore not retarded by the shock absorber. When the pressure in the intake manifold rises, in response to acceleration of the engine or the like, the clutch springs move the parts toward automatic position comparatively rapidly. When lever 31 attains a predetermined position, portion 32 thereof contacts ear 168 of lever 167, and movement of the parts thereafter is controlled by the shock absorber in the manner previously described.

Although I preferably locate lever 167 (by means of screw 174), so that it will be picked up by lever 31 when the latter reaches a predetermined position, intermediate disengaged and automatic positions, it is to be understood that screw 174 may be adjusted in some installations to cause this action to take place in any other manner that the circumstances may require for proper operation. Spring or like means may also be installed in the device to eliminate any shock that may tend to be set up by the "picking up" action occurring during this operation.

I have illustrated, and I prefer to employ the reciprocating type of shock absorber in my control mechanism, but it is to be understood that any other type of shock absorber, such as a rotary valve type, or any other retarding mechanism, may be utilized without departing from the spirit of the present invention. This form of the invention may be employed in the device shown in Figures 11 and 12 by allowing lever 167 to cooperate with lever 31a or 111.

In connection with all of the modifications of my invention, I wish it to be understood that vacuum line 53 may be tapped into the intake manifold adjacent the throttle valve as shown in Figure 2, or it may be tapped into any other portion of the manifold and be associated with an automatic check valve or an accelerator controlled valve of the type shown in my above mentioned co-pending applications, if desired.

With particular reference to the modifications of my invention shown in Figures 15, 16 and 17, it is entirely feasible to connect line 53 directly to the intake manifold without reference to the location of the throttle valve and without utilizing valves therewith, and it is to be understood that line 53 is preferably connected to the intake manifold in this manner in the modifications shown in these figures of the drawings.

With the organization just described, it is apparent that when the clutch has been automatically engaged in the manner described in connection with these modifications of the inventions, that as the intake manifold pressure varies as the throttle is opened and closed, the power cylinder will exert forces tending to move the throwout assembly axially as the accelerator is alternately depressed and released during normal driving operation. This action, at the lower speeds, through lever 31, shaft 21, the throwout assembly and levers 13, results in partially compressing springs 12 and thereby relieving the plates of a portion of their driving pressure. With the power assembly shown, it is possible to disengage the clutch with a vacuum of between ten and twelve inches of mercury, and since the intake manifold vacuum under many operating conditions, when it is desired to apply full driving pressure to the plates, may have a value of three to four inches of mercury, it is apparent that this vacuum operating through the piston and cylinder assembly, slightly retracts the reaction plate and thereby removes a part of the driving pressure of springs 12 from the plates, which under some conditions might permit them to undergo slippage.

In order to avoid this feature, I have devised a balancing or returning assembly for opposing the action of the vacuum and for holding the parts in engaged position whenever the intake vacuum is below a predetermined value. This balancing device may be applied to any of the modifications of my invention, but I have illustrated it as associated with that shown in Figure 17. With continued reference to this figure, a bracket member 183 having a plurality of apertures 184 provided therein, is secured to lever 31 by means of a screw 185 or the like. Preferably a tension spring 186 is connected to bracket 183 by means of a hook portion 187 formed thereon. The other end of spring 186 is anchored to any suitable support. Spring 186 is stronger than spring 178 and is preferably of such strength as to hold the parts in engaged position when the power cylinder is subjected to a vacuum of approximately three to five inches of mercury, depending upon the effective area of the piston and the character of the installation involved. If it is found, upon assembling the device, that the spring pressure is not correct, it may be readily adjusted by selectively positioning hook portion 187 of spring 186 in the proper aperture 184 to effect the results desired.

The herein described vacuum balancing or opposing spring is merely one form of mechanism that may be employed to restrain the power cylinder against producing inadvertent or undesirable actuation of the throwout assembly in response to any slight pressure fluctuations that occur in the intake manifold during normal driving conditions, and it is to be understood that any other suitable mechanism may be employed to achieve these results without departing from the spirit of the present invention.

With reference to all of the forms of my invention, the retarding mechanism is so designed that it checks movement of the parts, or initiates a retarding influence, when the parts, in moving from disengaged position toward automatic position, attain a position preferably just in advance of that sufficient to bring the plates into engagement, if weights 22 should be completely out in engagement with their stops, so that the comparatively fast movement of the parts will not bring the plates into engagement under any condition. At this point, the retarding mechanism retards movement of the parts, so that if the engine is for any reason maintained above the engaging speed of weights 22, the plates will nevertheless be smoothly brought into engagement. Under normal conditions, however, the engine is operating at a speed which is below the operating speed of weights 22 when the retarding action is initiated, so that as it accelerates, weights 22 rock outwardly and bring the plates into at least initial engagement by the time the parts attain automatic position under the influence of the bleeding action.

In the event that the driven member is rotating at a greater speed than the driving member when the parts are moving toward automatic position under the influence of the retarding mechanism, engagement of the clutch causes the load, acting through the driven member, to accelerate the driving member, with the result that weights 22 rock outwardly and cause the plate pressure to build up at a rate which is greater than that which would take place were the driving member accelerated under the influence of the engine and was picking up the load. The "Servo" or self-energized clutch action resulting from the driven member picking up the driving member is not objectionable however as the retarding mechanism controls movement of the parts throughout this range.

When the parts attain automatic position under the control of the retarding mechanism, weights 22 have moved outwardly, and as the engine is further accelerated, they cause the plate pressure to build up at a further rate, and when the bleeding action has proceeded to a predetermined point, the reaction plate is released and the full driving pressure of springs 12 is applied to the plates, thereby effecting the second or power responsive stage of clutch engagement, as previously explained.

In Figure 18, I have illustrated the cylinder shown in Figures 15 and 16, as it appears when it is provided with a modified form of bleeding arrangement. With continued reference to this figure, cylinder 153 is provided with apertures 158a and 158b, which are staggered or offset with respect to each other.

Aperture 158a is so located that piston 151 will cover it when the parts reach the intermediate position just described when they are moving from disengaged to automatic position, and aperture 158b is so disposed that piston 151 will cover it when the parts are disposed in automatic position.

The operation of this device is somewhat similar to that described in connection with the mechanisms shown in Figures 15, 16 and 17, with the exception that when the parts are moving from disengaged position to engaged position, and piston 151 is moving downwardly in cylinder 153 under the influence of springs 12, the movement is comparatively rapid until piston 151 cuts off port 158a, because the air, oil or other fluid, which is trapped below piston 151, may be exhausted through ports 158a and 158b. When port 158a is cut off, movement of the parts is retarded because air is then compelled to be exhausted solely through port 158b and orifice 159 in the piston. When automatic position is attained, and piston 151 cuts off port 158b, the parts are further retarded as the air is now compelled to bleed solely through orifice 159.

Although I have illustrated one form of mechanism for producing retarding stages in the mechanism, it is to be understood that other suitable forms of devices may be utilized for producing the same result, and the appended claims are intended to comprehend such equivalent structures.

With reference now to Figure 19, I have shown a valve which may be incorporated in the vacuum lines of any of the forms of my invention for bleeding atmospheric air into the left-hand end of the power cylinders when the accelerator or other speed controlling mechanism is actuated to a predetermined extent, so as to relieve the power cylinder of all intake manifold pressure fluctuations, and allow the retarding mechanism to control movement of the parts toward engaged position.

A valve body or casing 201 threadedly receives the sections of vacuum pipe 53a and is provided with a vertical passage 202 communicating therewith. A valve 203, having a reduced portion 204, is mounted for longitudinal movement in a bore 205 located in body 201, and is adapted to be actuated by a link or rod 206, which is secured thereto by means of a cotter pin 207 or the like. Link 206 may be connected to a lever carried by the accelerator cross-shaft (not shown) or to the other power-delivery controlling mechanism of the prime mover utilized in the drive involved. The parts are shown in Figure 19 in the positions they assume when the engine or other prime mover is operating at idling speed.

Communicating with bore 205 is a bleed passage 208 and a longitudinal groove 209. With the parts disposed in the positions shown in Figure 19, the power cylinder is placed in communication with the intake manifold by way of the lower section of pipe 53a, passage 202, reduced portion 204 of valve 203, and the upper section of pipe 53a. When valve 203 is moved so as to bring its reduced portion 204 into registry with passage 208, communication is cut off between the intake manifold and the power cylinder, and air may bleed comparatively rapidly into the cylinder through passage 208, reduced portion 204, groove 209, passage 202, and the lower section of pipe 53a.

As previously explained, the valve mechanism just described may be employed with any of the forms of my invention, but for the sake of brevity I will describe its operation in connection with the mechanism shown in Figure 17 of the drawings.

With the engine operating at idling speed, and with the parts held in automatic position as shown in Figure 17, against the pull of the power cylinder by the latch mechanism, and the accelerator is depressed so as to automatically engage the clutch, the weights bring the plates into engagement in response to acceleration of the engine. When the accelerator has been depressed to a predetermined extent valve 203 is moved with its reduced portion 204 into registry with port 203, and atmospheric air is allowed to bleed into the power cylinder. However, in view of the fact that spring 178 maintains lug 168 in contact with lever 31 at all times, the retarding assembly immediately exerts a retarding influence upon the throwout assembly, and the parts slowly bleed back toward engaged position under the influence of springs 12, 30 and 186. In this connection, it should be noted that spring 186 may be dispensed with if desired because the valve mechanism utilized in this form of the invention cuts off communication between the intake manifold and the power cylinder under conditions where the vacuum action might prove to be undesirable.

When the latch is unlocked and the power cylinder pulls the parts toward disengaged position, arm 167 moves into engagement with stop screw 174 under the influence of spring 178 and remains in this position while lever 31 and the throwout mechanism moves into disengaged position under the action of the intake manifold vacuum. When the clutch has been thus disengaged, and the accelerator is depressed, the vacuum diminishes to some extent, and weights 22 initiate outward movement in response to centrifugal force, but they are incapable of bringing the plates into engagement by reason of the fact that the parts are held in disengaged position. When the accelerator is depressed to a predetermined degree, valve 203 is actuated and atmospheric air is rapidly bled into the power cylinder, with the result that the parts move toward automatic position comparatively rapidly under the influence of the clutch springs. When the parts, in undergoing this rapid bleeding action, bring lever 31 into engagement with lug 168 of lever 167, the latter is picked up, and through its interconnection with the shock absorber, it exerts a retarding influence upon the parts, and they bleed slowly back toward engaged position. When the parts are moving toward automatic position under the retarding influence of the shock absorber, and prior to reaching automatic position, depending upon the rate of acceleration and other factors, weights 22 bring the plates into engagement, and the action thereafter is similar to that described in connection with the former modifications of my invention.

This form of my invention is especially useful, and is preferred where the design of the drive mechanism, and the operating characteristics of the internal engine, are such, that when the clutch is completely disengaged under the influence of the intake manifold vacuum, it is impossible, or not feasible to drop the vacuum sufficiently, with no load on the engine, to cause it to allow the parts to move toward automatic position, with the result that the clutch would not engage, irrespective of to what extent the engine was accelerated. As the present device cuts off the vacuum and bleeds atmospheric air into the cylinder when the throttle is opened to a predetermined degree, the parts are allowed to move from disengaged to automatic position independently of the influence of pressure fluctuations in the intake manifold.

Although I have illustrated a specific form of valve in Figure 19, it is to be understood that any suitable valve mechanism may be used without departing from the spirit of the present invention, and I contemplate this use of any of the valves shown in my co-pending application, Serial No. 669,766 filed May 9, 1933, in this relation.

Although I have illustrated and prefer to employ piston and cylinder assemblies or other fluid controlled devices for retarding the action of the parts under the influence of springs 12 when they approach automatic position, it is to be understood that any other suitable means may be employed to retard the action of the parts when they move to engaged position if desired, without departing from the spirit of the present invention. Moreover, the various cylinder and piston organizations herein disclosed may be operated by fluid at greater than atmospheric pressure if desired, such as oil or compressed air, and organizations of this character are intended to be embraced by the appended claims.

Although I prefer to use a latch mechanism of the type herein disclosed, it is to be understood that any other suitable type of latch may be successfully employed in my mechanism, and it may be associated with some part of the mechanism other than lever 61, if desired, and it is to be understood that arrangements of this character are embraced by the present invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a clutch mechanism, a driving member and a driven member mounted for engagement and disengagement; engaging means tending to bring said members into engagement; power operated controlling means for moving said members toward disengagement against the action of said engaging means; speed responsive means for moving said members toward engaged position when they are under the influence of said controlling means; and means associated with said controlling means to cause said engaging means to automatically effect engagement of said members in stages.

2. The mechanism defined in claim 1 wherein said last named means is controlled in accordance with movements of said controlling means.

3. In a clutch mechanism, driving and driven members mounted for engagement and disengagement; resilient means tending to bring said members into engagement; controlling means for moving said members into disengaged position against the action of said resilient means; speed responsive means for moving said members toward engagement when they are under the influence of said controlling means; and means for varying the rate of movement of said members when they are moving toward engagement under the influence of said resilient means.

4. In a clutch mechanism, driving and driven members mounted for engagement and disengagement; engaging means tending to bring said members into engagement; controlling means for moving said members toward disengagement against the action of said engaging means; speed responsive means for moving said members toward engaged position when they are under the influence of said controlling means; power means for operating said controlling means; and means for automatically causing said power means to exert a two-stage retarding force upon return movement of said controlling means.

5. In a clutch mechanism, a driving member and a driven member mounted for engagement and disengagement; engaging means tending to bring said members into engagement; power operated means; controlling means operatively associated with said power operated means for moving said members toward disengagement against the action of said engaging means; releasable means for selectively arresting said controlling means to prevent said power means from causing disengagement of said members comprising a member pivoted to an element operatively associated with said controlling means, said last named member adapted to lie directly in the path of said operating element when said element is moving toward disengagement.

6. In a clutch mechanism, a driving member and a driven member mounted for engagement and disengagement; engaging means tending to bring said members into engagement; controlling means for causing disengagement of said members; power operated means operably associated with said controlling means; releasable means for selectively arresting said controlling means for preventing said power means from causing full disengagement of said members comprising a member pivoted to an element operably associated with said controlling means and to another member, to thereby form a toggle; and means for breaking the toggle to allow said power operated means to fully disengage said members.

7. In a centrifugal clutch mechanism, a clutch member mounted for movement from an engaged to a disengaged position; resilient means for urging said member into engaged position; controlling means comprising fluid operated means for moving said member into disengaged position against the action of said resilient means; a source of fluid energy; means connecting said fluid energy source and said fluid operated means; a check valve in said connecting means adapted to allow said fluid energy to actuate said fluid operated means for disengaging said clutch and for preventing return movement of said controlling means when said clutch member substantially attains an automatic position located intermediate said engaged and disengaged positions; and means for by-passing said check valve for allowing said clutch member to return to engaged position under the influence of said resilient means.

8. The combination set forth in claim 7 together with means for adjusting the place in the return movement of said controlling means where the return movement preventing action of said power means will occur.

9. The combination as set forth in claim 7, together with means for retarding the return movement of said controlling means under the influence of said engaging means in stages.

10. In a centrifugal clutch mechanism, a clutch member mounted for movement from an engaged to a disengaged position; resilient means for urging said member into engaged position; controlling means comprising fluid operated means for moving said member into disengaged position against the action of said resilient means; a source of fluid energy; means connecting said source and said fluid operated means; a check valve in said connecting means adapted to allow said fluid energy to actuate said fluid operated means for disengaging said clutch and for preventing return of said controlling means when said clutch member substantially attains an automatic position located intermediate said engaged and disengaged positions; and a by-pass means connected in parallel with said check valve and actuated in accordance with movement of said clutch member to variably retard return movement of said clutch member under influence of said resilient means from said automatic position to said engaged position.

11. In a centrifugal clutch mechanism, a clutch member mounted for axial movement from a clutch engaging position to a clutch disengaging position; resilient means for yieldingly resisting movement of said member toward disengaged position; power means for moving said member toward disengaging position; retarding means operably associated with said power means for allowing said member to move comparatively rapidly from said disengaged position into an automatic position located intermediate said engaging and disengaging positions and for allowing said member to move at a slower rate from said intermediate automatic position toward engaged position under the influence of said resilient means, said retarding means comprising an expansible chamber means; a connecting member operably associated with said chamber means and said clutch member having a passage adapted to form communication between the interior and exterior of said expansible chamber means only during movement of said member from said disengaged to said intermediate automatic position.

12. In a clutch mechanism, driving and driven members mounted for engagement and disengagement; engaging means tending to bring said members into engagement; controlling means for causing disengagement of said members against the action of said engaging means; power operated means operatively associated with said controlling means; releasable means for selectively arresting said controlling means to prevent said power operated means from causing disengagement of said members comprising a member pivoted to an element having a one-way connection with said controlling means; said member adapted to lie directly in the path of said element when said element is moved toward disengaged position; and means for causing disengagement of said members independently of said arresting means.

13. In a clutch mechanism a clutch member mounted for movement from an engaged to a disengaged position; resilient means for urging said member toward engaged position; controlling means associated with said clutch member; fluid operated means operatively associated with said controlling means for moving said member into disengaged position against the action of said resilient means; retarding means operatively associated with said controlling means; and means, including a one-way connection, for varying the retarding action of said retarding means in accordance with movement of said controlling means.

14. In a clutch mechanism, driving and driven members mounted for engagement and disengagement; engaging means for urging said members toward engagement; controlling means for moving said members into disengagement against the action of said engaging means; speed responsive means for moving said members toward engagement when they are under the influence of said controlling means; and retarding means adapted to be picked up on the return movement of said controlling mechanism to retard the return movement of said members toward engagement.

15. In a clutch, driving and driven members mounted for engagement and disengagement; engaging means tending to bring said members into engagement; power operated means for maintaining said members disengaged against the action of said engaging means when said driving member is rotated at a predetermined idling speed; speed responsive means for automatically bringing said members into engagement when said driving member is rotated at speeds substantially in excess of said idling speed, said power operated means being selectively operable to move said members a further distance and maintain them in such condition that said speed responsive means is incapable of bringing them into engagement.

16. The clutch described in claim 15, wherein said power operated means is operable to automatically allow said engaging means to bring said members into engagement when said driving member is at rest or is rotated at speeds substantially lower than said idling speed.

17. In a centrifugally operable clutch having a control member mounted for movement into an engaged position wherein the clutch is engaged at all speeds; a disengaged position wherein the clutch is disengaged at all speeds; and an intermediate position, wherein clutch operation is responsive to the speed of rotation of certain of its parts; power operated means for urging said control member from engaged position toward disengaged position; and a device for selectively arresting said member when it attains said intermediate position under the influence of said power means.

18. The clutch control mechanism described in claim 17, wherein said device comprises a selectively releasable latch disposed in the path of movement of said control member.

19. The clutch mechanism described in claim 6, wherein said means for breaking the toggle is coupled to the latter with a one-way connection, for permitting said toggle to undergo breaking movement independently thereof.

JOSEPH E. PADGETT.